United States Patent
de Souza et al.

(10) Patent No.: US 7,803,270 B2
(45) Date of Patent: *Sep. 28, 2010

(54) PROCESS FOR THE EXTRACTIVE OXIDATION OF CONTAMINANTS FROM RAW FUEL STREAMS CATALYZED BY IRON OXIDES

(75) Inventors: Wladmir Ferraz de Souza, Rio de Janeiro (BR); Lilian Ernst, São Mateus do Sul (BR)

(73) Assignee: Petroleo Brasileiro S.A. - Petrobras, Rio De Janiero (BR)

( * ) Notice: Subject to any disclaimer, the term of this patent is extended or adjusted under 35 U.S.C. 154(b) by 1014 days.

This patent is subject to a terminal disclaimer.

(21) Appl. No.: 11/078,291

(22) Filed: Mar. 14, 2005

(65) Prior Publication Data

US 2006/0131214 A1    Jun. 22, 2006

(30) Foreign Application Priority Data

Dec. 21, 2004   (BR) .................................. 0405847

(51) Int. Cl.
    *C10G 27/04* (2006.01)
(52) U.S. Cl. .................... 208/196; 208/208 R; 208/219; 208/222; 208/244; 208/254 R; 208/255; 208/256; 208/295; 208/299
(58) Field of Classification Search ................. 208/196, 208/208 R, 219, 222, 244, 254 R, 255, 256, 208/295, 299
See application file for complete search history.

(56) References Cited

U.S. PATENT DOCUMENTS

| 2,591,946 | A | 4/1952 | Krause et al. |
| 2,804,473 | A | 8/1957 | Phillips et al. |
| 3,847,800 | A | 11/1974 | Guth et al. |
| 3,987,146 | A | * 10/1976 | Clay et al. ............... 423/239.1 |
| 4,311,680 | A | 1/1982 | Frech et al. |
| 5,755,977 | A | 5/1998 | Gurol et al. |
| 5,917,049 | A | 6/1999 | Suverkropp et al. |
| 6,126,838 | A | 10/2000 | Huang et al. |
| 6,140,294 | A | 10/2000 | Delroisse et al. |
| 6,544,409 | B2 | 4/2003 | de Souza |
| 7,153,414 | B2 | * 12/2006 | De Souza ............... 208/208 R |
| 7,175,755 | B2 | * 2/2007 | de Souza ..................... 208/237 |
| 2004/0108252 | A1 | 6/2004 | de Souza |
| 2004/0222134 | A1 | 11/2004 | de Souza |

FOREIGN PATENT DOCUMENTS

EP    0 565 324 A1    4/1993

* cited by examiner

*Primary Examiner*—Glenn Caldarola
*Assistant Examiner*—Prem C. Singh
(74) *Attorney, Agent, or Firm*—Sughrue Mion, PLLC (57) ABSTRACT

A process is described for the extractive oxidation of contaminants present in raw fuel streams rich in heteroatomic polar compounds and catalyzed by iron oxides contained in natural limonitic goethite, said process comprising contacting said streams with an oxidation pair which is a peroxide in solution/organic acid in amount of at least 3 and an amount between 0.01 and 10 wt % of an iron oxide, both based on the feed, the iron oxide being made up of a reduced natural limonitic goethite. The goethite reduction by a hydrogen stream has the advantage of lowering the migration of non-contaminating polar hydrocarbons from the fuel stream to the aqueous phase, at the same time obtaining higher mass yield of final product fuel while the level of target contaminants to be removed is maintained relative to the state-of-the-art process. Process yields attain 98% weight/weight.

5 Claims, 4 Drawing Sheets

PROCESS FOR THE EXTRACTIVE OXIDATION OF CONTAMINANTS FROM RAW FUEL STREAMS CATALYZED BY IRON OXIDES

FIELD OF THE INVENTION

The present invention belongs to the field of extraction processes, more specifically, to processes of extractive oxidation of contaminants from raw fuel streams with the aid of an oxidation pair and a catalyst, which is a reduced iron oxide.

BACKGROUND OF THE INVENTION

Extractive oxidation used as a naphtha treating process is well-known, for example, the sweetening naphtha process, typically comprising a catalytic oxidation via $O_2$ in the presence of NaOH or KOH of odor-generating mercaptans of certain raw naphthas, more specifically those from fluid catalytic cracking. See U.S. Pat. No. 2,591,946 where is taught a sweetening process for sour oils whereby mercaptans are removed from said oils by carrying out a reaction the catalyst of which is KOH, $O_2$ and 0.004 to 0.1 wt % copper oxide based on the KOH solution.

Also, an article in the Oil and Gas Journal vol. 57(44) p.73-78 (1959) entitled. "Low Cost Way to Treat High-Mercaptan Gasoline". by K. M. Brown et al, is directed to the discussion of the Merox process and other prior art procedures.

However, such state-of-the-art processes do not apply to raw naphtha where the target substances are those containing unsaturations and nitrogen functionalities, chiefly dienes and substances having nitrogen functionalities of a basic character, which not only cause odor but also naphtha instability caused by color as well as turbitidy caused by gums, without mentioning that such basic nitrogen compounds are harmful to the hydrodesulfurization processes used in the naphtha finishing processes that precede commercialization.

The peroxide-aided oxidation is a promising path for the refining of fossil oils, and may be directed to several goals, for example to the removal of sulfur and nitrogen compounds present in fossil hydrocarbon streams, mainly those used as fuels for which the international specification for sulfur content becomes more and more stringent.

One further application is the withdrawal of said compounds from streams used in processes such as hydrotreatment, where the catalyst may be deactivated by the high contents in nitrogen compounds.

Basically, the peroxide oxidation converts the sulfur and nitrogen impurities into higher polarity compounds, those having a higher affinity for polar solvents relatively immiscible with the hydrocarbons contaminated by the sulfur and nitrogen compounds. In this way, the treatment itself comprises an oxidation reaction step followed by a separation step of the oxidized products by polar solvent extraction and/or adsorption and/or distillation.

The oxidation reaction step using peroxides, as well as the separation steps of the oxidized compounds from the hydrocarbons have been the object of various researches.

Thus, published European Application EP0565324A1 teaches a technique exclusively focused on the withdrawal of organic sulfur from petroleum, oil shale or coal having an oxidation reaction step with an oxidizing agent like $H_2O_2$ initially at 30° C. and then heated at 50° C. in the presence of an organic acid (for example HCOOH or AcOH) dispensing with catalysts, followed by (a) a solvent extracton step, such as, N'-dimethyl formamide, dimethylsulfoxide, N,N'-dimethylacetamide, N-methylpyrrolidone, acetonitrile, trialkylphosphates, methyl alcohol, nitromethane among others; or by (b) an adsorption step with alumina or silica gel, or c) a distillation step where the improved separation yields are caused by the increase in boiling point of the sulfur oxidized compounds.

A similar treatment concept is used by D. Chapados et al in "Desulfurization by Selective Oxidation and Extraction of Sulfur-Containing Compounds to Economically Achieve Ultra-Low Proposed Diesel Fuel Sulfur Requirements", NPRA 2000 Annual Meeting, Mar. 26-28, 2000, San Antonio, Tex., Paper AM-00-25 directed to a refining process also focused on the reduction of the sulfur content in oils, the oxidation step occurring at temperatures below 100° C. and atmospheric pressures, followed by a polar solvent extraction step and by an adsorption step. The authors further suggest the use of a solvent recovery unit and another one for the biological treatment of the concentrate (extracted oxidized products) from the solvent recovery unit, this unit converting said extracted oxidized products into hydrocarbons.

According to the cited reference by Chapados et al., the reaction phase consists of an oxidation where a polarized —O—OH moiety of a peracid intermediate formed from the reaction of hydrogen peroxide and an organic acid performs an electrophilic oxidation of the sulfur compounds, basically sulfides such as benzothiophenes and dibenzothiophenes and their alkyl-related compounds so as to produce sulfoxides and sulfones.

U.S. Pat. No. 3,847,800 teaches that the oxidation of nitrogen compounds, such as the quinolines and their alkyl-related compounds so as to produce N-oxides (or nitrones) can be promoted as well when reacting these compounds with a nitrogen oxide.

According to U.S. Pat. No. 2,804,473, the oxidation of amines with an organic peracid leads to N-oxides, therefore a reaction pathway analogous to that of sulfur-containing compounds is expected for the oxidation of nitrogen-containing compounds with a peracid derived from the peroxideforganic acid couple. In addition, the same US patent teaches a process for the production of lower aliphatic peracids.

According to this publication, peracids are useful in a variety of reactions, such as oxidation of unsaturated compounds to the corresponding alkylene oxide derivatives or epoxy compounds.

It is also known that hydrogen peroxide naturally decomposes into unstable intermediates that generate $O_2$ and $H_2O$, such process being accelrated by light, heat and mainly by the pH of the medium.

U.S. Pat. No. 5,917,049 teaches a process for preparing dicarboxylic acids containing at least one nitrogen atom where the corresponding heterocyclic compound having a fused benzene ring containing at least one nitrogen atom is oxidized in the presence of hydrogen peroxide, a Bronsted acid and an iron compound. The preferred iron compound is iron nitrate and nitric acid is used as Bronsted acid. The reaction occurs in an aqueous medium.

Besides, U.S. Pat. No. 4,311,680 teaches a process for removing sulfur compounds such as $H_2S$, mercaptans and disulfides contained in gaseous streams such as natural gas by directing said gaseous stream through a $Fe_2O_3$ fixed bed in the presence of a hydrogen peroxide aqueous solution.

On the other hand, several publications report the use of the Fenton's reagent exclusively directed to the removal of pollutants from municipal and industrial aqueous wastes. See the article by C. Walling, "Fenton's Reagent Revisited", Accts. Chem. Res., Vol. 8, p. 125-131 (1975), U.S. Pat. No. 6,126, 838 and U.S. Pat. No. 6,140,294 among others.

Fenton's reagent, known since 1894, is traditionally a mixture of $H_2O_2$ and ferrous ions exclusively in an aqueous medium, so as to generate the hydroxyl radical OH. The hydroxyl radical is one of the more reactive species known. The Relative Oxidation Power, (ROP) of this radical is 2.06 (based on $Cl_2$ the ROP of which is 1.0), being higher than that of singlet oxygen (ROP=1.78)>$H_2O_2$(ROP=1.31)>HOO. (ROP=1.25)>permanganate (ROP=1.24), this rendering such radical able to react with countless compounds.

However, either due to the presence of $Fe^{3+}$ or to the natural dissociation of hydrogen peroxide, secondary reactions consume or compete with the hydroxyl radical.

Such secondary reactions can be minimized by reducing the pH since the protic acidity reverts the dissociation equilibrium of $H_2O_2$ into $H^+$ and OOH., so as to prevent the transformation of the generated OOH— into HOO., which in turn will take more $H_2O_2$ to $H_2O$ e $O_2$ in spite of the co-generation of the desired hydroxyl radical. On the other hand, excessive pH reduction leads to the precipitation of $Fe(OH)_3$ which catalyses the decomposition of $H_2O_2$ into $O_2$.

Thus, it is recommended to work at pH 2.0 to 6.0, the reaction pH being afterwards adjusted to 6.1-9.0 to allow a better product separation by the flocculation of residual ferrous sulfate salts, when such salt is the source of ferrous cations of the conventional Fenton's reagent.

However, in the case of the production of free ferric cations which could consume or inhibit the generation of the hydroxyl radical those can be scavenged by complexing agents (such as for example phosphates, carbonates, EDTA, formic aldehyde, citric acid) only if such agents do not scavenge at the same time the ferrous cations also solved in aqueous medium and required for the oxidation reaction.

Active Fe sources linked to a solid matrix useful for generating hydroxyl radicals are the iron oxyhydrates crystals, FeOOH, such as goethite, used for the hexachlorobenzene oxidation found as a pollutant of subterranean water resources.

R. L. Valentine e H. C. A. Wang, in "Iron oxide Surface Catalyzed Oxidation of Quinoline by Hydrogen Peroxide", Journal of Environmental Engineering, 124(1), 31-38 (1998), report a procedure used exclusively in aqueous effluents using aqueous suspensions of iron oxides such as ferrihydrite, a semicrystalline iron oxide and goethite, both being previously synthesized, as catalysts of the hydrogen peroxide oxidation of a water pollution model compound—quinoline, present in concentrations of nearly 10 mg/liter in an aqueous solution the features of which mime a natural water environment.

Among the iron oxides used by the authors, a suspension of crystalline goethite containing a complexing agent (for example carbonates) produced, after 41 hours reaction, higher quinoline abatement from the aqueous solution. According to the author, the complexing agent is adsorbed on the catalyst surface so as to regulate the $H_2O_2$ decomposition. The article does not mention the formed products and the Goethite employed was a pure crystalline material synthesized by aging $Fe(OH)_3$ at 70° C. and pH=12 during 60 h.

Pure goethite such as the one utilized by Valentine et al. is hardly found in free occurrences in nature; however, it can exist as a component of certain natural ores.

U.S. Pat. No. 5,755,977 teaches a process where a contaminated fluid such as water or a gas stream containing at least one contaminant is contacted in a continuous process with a particulate goethite catalyst in a reactor in the presence of hydrogen peroxide or ozone or both to decompose the organic contaminants. It is mentioned that the particulate goethite may also be used as a natural ore form. However, the particulate goethite material actually used by the author in the Examples was a purified form purchased from commercial sources, and not the raw natural ore.

Goethite is found in nature in the so-called limonite and/or saprolite mineral clays, occurring in laterites (natural occurrences which were subjected to non-eroded weathering, i.e. by rain), such as in lateritic nickel deposits, especially those layers close by the ones enriched in nickel ores (from 5 to 10 m from the surface). Such clays constitute the so-called limonite zone (or simply limonite), where the strong natural dissolution of Si and Mg leads to high Al, Ni concentrations (0.8-1.5 weight %), also Cr and mainly Fe (40-60 weight %) as the hydrated form of FeOOH, that is, $FeOOH_n\ H_2O$.

The layers below the limonite zone show larger amounts of lateritic nickel and lower amounts of iron as Goethite crystals. This is the so-called saprolite zone or serpentine transition zone (25-40 weight % Fe and 1.5-1.8 weight % Ni), immediately followed by the garnierite zone (10-25 weight % Fe and 1.8-3.5 weight % Ni) that is the main source of garnierite, a raw nickel ore for industrial use.

The open literature further teaches that the crystalline iron oxyhydroxide FeOOH may assume several crystallization patterns that may be obtained as pure crystals by synthetic processes. Such patterns are: α-FeOOH (Goethite cited above), γ-FeOOH (Lepidocrocite), β-FeOOH (Akaganeite), or still δ'-FeOOH (Ferroxyhite), this latter having also magnetic properties. The most common crystallization patterns are Goethite and Lepidocrocite.

The iron oxyhydroxide crystalline form predominant in limonite is α-FeOOH, known as Goethite. The Goethite (α-FeOOH) crystallizes in non-connected layers, those being made up of a set of double polymeric ordered chains. This is different, for example, from the synthetic form Lepidocrocite (γ-FeOOH), which shows the same double ordered chain set with interconnected chains. This structural difference renders the α-FeOOH more prone to cause migration of free species among the non-connected layers.

Limonite contains 40-60 weight % iron besides lower contents of nickel, chrome, cobalt, calcium, magnesium, aluminum and silicon oxides, depending on the site of occurrence.

The limonite specific area is 40-50 $m^2$/g. Besides being a low cost mineral, of easy pulverization and handling; its dispersion characteristics in hydrophobic mixtures of fossil hydrocarbons are excellent.

Limonite was found to be easily dispersed in fossil oils as a precursor of pyrrothite ($Fe_{1-x}$ S), as reported by T. Kaneko et al in "Transformation of Iron Catalyst to the Active Phase in Coal Liquefaction", Energy and Fuels 1998, 12, 897-904 and T. Okui et al, in "Proceedings of the Intl. Symposium on the Utilization of Super-Heavy Hydrocarbon Resources (AIST-NEDO)", Tokyo, September 2000.

This behavior is different from that of a Fe(II) salt such as ferrous sulfate or ferrous nitrate, which requires an aqueous medium to effect the formation of Fenton's reagent.

U.S. Pat. No. 6,544,409B2 of the Applicant and herein completely incorporated as reference teaches the catalytic oxidation of organic compounds in a fossil hydrophobic medium in the presence of a peracid (or a peroxide/acid couple), the oxidation reaction being catalyzed by an iron oxide such as a powdered limonite ore working as a highly dispersible source of iron, which is highly catalytically active in this petroleum medium.

Published International Application WO04/099346 (corresponding to published US Application 2004/0222134) also of the Applicant and equally fully incorporated as reference teaches a process for the extractive oxidation of sulfur and nitrogen present in huge amounts in raw hydrocarbon streams rich in heteroatomic compounds, such streams being originated either from fossil oils or from the processing of such oils, the process serving to increase the polarity of such heteroatomic compounds, the simultaneous oxidation and aqueous extraction of the resulting oxidated compounds being effected in the presence of organic acids and peracids.

Published US Application 2004/0108252 (USSN 2002 10/314963) also of the Applicant and herein completely incorporated as reference teaches a process for the upgrading of raw hydrocarbon streams rich in heteroatomic polar compounds through the extractive oxidation of sulfur, nitrogen, conjugated dienes and other unsaturated compounds from such streams, the process involving treating such streams with an oxidizing couple which is a peroxide solution/organic acid and a limonite ore, under an acidic pH, atmospheric pressure and ambient or higher temperature.

Oxidized heteroatomic compounds are extracted into the aqueous phase, while the oxidized hydrocarbon is separated from the catalyst by decanting, etc. In this way it is possible to remove 90% by mass or more of all the nitrogen compounds and up to 99.75% by mass of the basic nitrogen compounds. However, this process leads to 5 to 10 wt % losses of the treated hydrocarbon product to the aqueous phase combined to the oxidized contaminants. Such losses should therefore be minimized.

The literature mentions processes for the treatment of organic compounds of fossil oils by oxidation in the presence of peracids (or peroxides and organic acids) as treating processes for aqeuous or gaseous organic media using Fenton's reagent, and also processes using the peroxide/organic acid couple in the presence of an iron oxide such as limonite.

However no description nor suggestion could be found in the literature for an extractive oxidation process for contaminants present in fuels, such process being catalyzed by iron oxides, where heteroatomic polar compounds, conjugated dienes and other unsaturated moieties of raw hydrocarbon streams are oxidized in the presence of an aqueous slurry of a peroxide in solution/organic acid couple and a reduced goethite iron oxide, such compounds being simultaneously removed from such streams by the oxidant itself, such process being described and claimed in the present application.

SUMMARY OF THE INVENTION

Broadly, the invention relates to a process for the extractive oxidation of contaminants present in raw fuel streams where heteroatomic polar compounds, conjugated dienes and other unsaturated moieties present in such streams are oxidized and simultaneously extracted into the aqueous phase by means of an aqueous slurry of a peroxide in solution/organic acid couple and an iron oxide ore containing natural limonitic goethite, under acidic pH, atmospheric pressure and ambient or higher temperature, while the oxidized hydrocarbon is oxidized from the catalyst, such process comprising bringing into contact the raw fuel stream under oxidation conditions in the presence of such oxidizing aqueous slurry and reduced natural limonitic goethite, whereby a reaction product is obtained at higher yields while the removal level of sulfur and nitrogen compounds from the said fuel stream is the same as in state-of-the-art processes.

Thus, the invention provides a process for the extractive oxidation of contaminants present in raw fuel streams at higher product yields than those obtainable through state-of-the-art processes.

The invention also provides a process for the extractive oxidation of contaminants present in raw fuel streams where the higher product yields are made possible in view of the lower loss by product migration to the aqueous phase.

The invention provides further a process for the extractive oxidation of contaminants present in raw fuel streams at higher product yields where the useful iron oxide catalyst is a limonite where a portion of the superficial Fe(III) of the Fe (III) particles is reduced fo Fe(II), this latter being a more active form for the generation of active oxidant radicals.

DETAILED DESCRIPTION OF THE PREFERRED MODE

The present invention relates therefore to a process for the extractive oxidation of contaminants present in raw fuel streams at higher product yields than those that can be obtained according to published US application US 2004/0108252 of the Applicant.

The invention makes use of a procedure consisting in the hydrogenation of the surface of a goethite-rich pulverized limonite ore, the limonite being made up of Fe(III)OOH crystals, said procedure allowing the conversion of Fe(III) atoms, at least those on the particle surface, to the reduced form Fe(II), which is the Fe oxidation state suitable to the straight formation of Fenton's reagent OH*. In this way, it is believed that the amount of Fenton's type oxidation of sulfur, nitrogen, conjugated dienes and other unsaturated compounds present in naphtha streams can be increased, besides the classical oxidation performed by the peracids per se.

According to the invention, the useful fuel feed to be submitted to the inventive process is a feed that has not been submitted to any hydrotreating, Merox or caustic wash process.

Such feed includes naphthas obtained from oil shale retorting or other refining processes such as those produced by the delayed coking of heavy crude resids or from any other thermal processing. The boiling point of the fuel to be submitted to the inventive process is between 30° C. and 300° C., preferably between 35° C. and 240° C. The sulfur contents reach up to 15,000 ppm, preferably between 4,000 and 9,000 ppm. Basic nitrogen contents reach up to 2,000 ppm while the total nitrogen contents reach 3,000 ppm or more. Further, the streams contain open or cyclic olefins, aromatics and conjugated dienes.

The treated stream obtained through the present process at yields of at least 97 wt % is upgraded in terms of less odor typical of raw naphthas, as well as better aspect, color and color stability. Further, in view of the removal of such contaminants, the treated stream is more suitable to undergo deep HDT.

The present technique is an optimization based on a modification of the iron oxide catalyst allowing an improvement in the mass yield of the treated product, that can attain 97-98 wt % or more based on the feed, without any reduction in the level of contaminant removal present in the raw naphtha streams (or in other light and medium hydrocarbons streams), said contaminants being responsible for odor and color instability or the refractory character of said streams to the HDT process.

The oxidation which is performed on the fuel stream results from a peracid that is formed in situ from a peroxide in solution/organic acid couple, the weight percent of the peroxide solution and organic acid based on the fuel being at least 3 and preferably from 6 to 15 for both the peroxide in solution and the organic acid.

The process modification that allows higher product yields relates to the iron oxide catalyst (natural limonitic goethite Fe(III)OOH) that undergoes a thermal treatment in the presence of $H_2$. During such thermal treatment, the natural limonitic goethite ore from Central Brazil mines is milled below 0.149 mm (100 mesh Tyler) and submitted to conditions of a confined atmosphere that contains oxygen-free hydrogen the purity of which is at least 80 wt %, at a pressure that is the same or higher than the atmospheric, at temperatures from the ambient and up to 500° C., for periods of time of up to 2 hours.

It is preferred that the confined atmosphere contains hydrogen at a purity between 90 to 100 wt %, and the hydrogen pressure is from the atmospheric to 20 bar, the temperature from the ambient up to 350° C. and the treatment period from 5 minutes to 1.5 hours.

Still more preferably, the hydrogen pressure is from the atmospheric to 10 bar, the temperature, from 200° C. to 350° C., and the treatment period is from 30 minutes to 1.5 hours.

The hydrogen flow rate during the reduction of limonite is between a state of absence of circulation up to flow rates of 10 L/min, or any other flow rate able to promote a $H_2$-rich atmosphere while at the same time securing the purge of the vapor resulting from the hydrogenation of hydroxyls from the goethite crystalline structure.

After said reducing treatment, the solid natural limonitic goethite that originally shows a yellowish ocher color turns into a brilliant, black solid having magnetic properties typical of magnetite, which combines Fe(II) and Fe(III) oxides.

Figure 1:
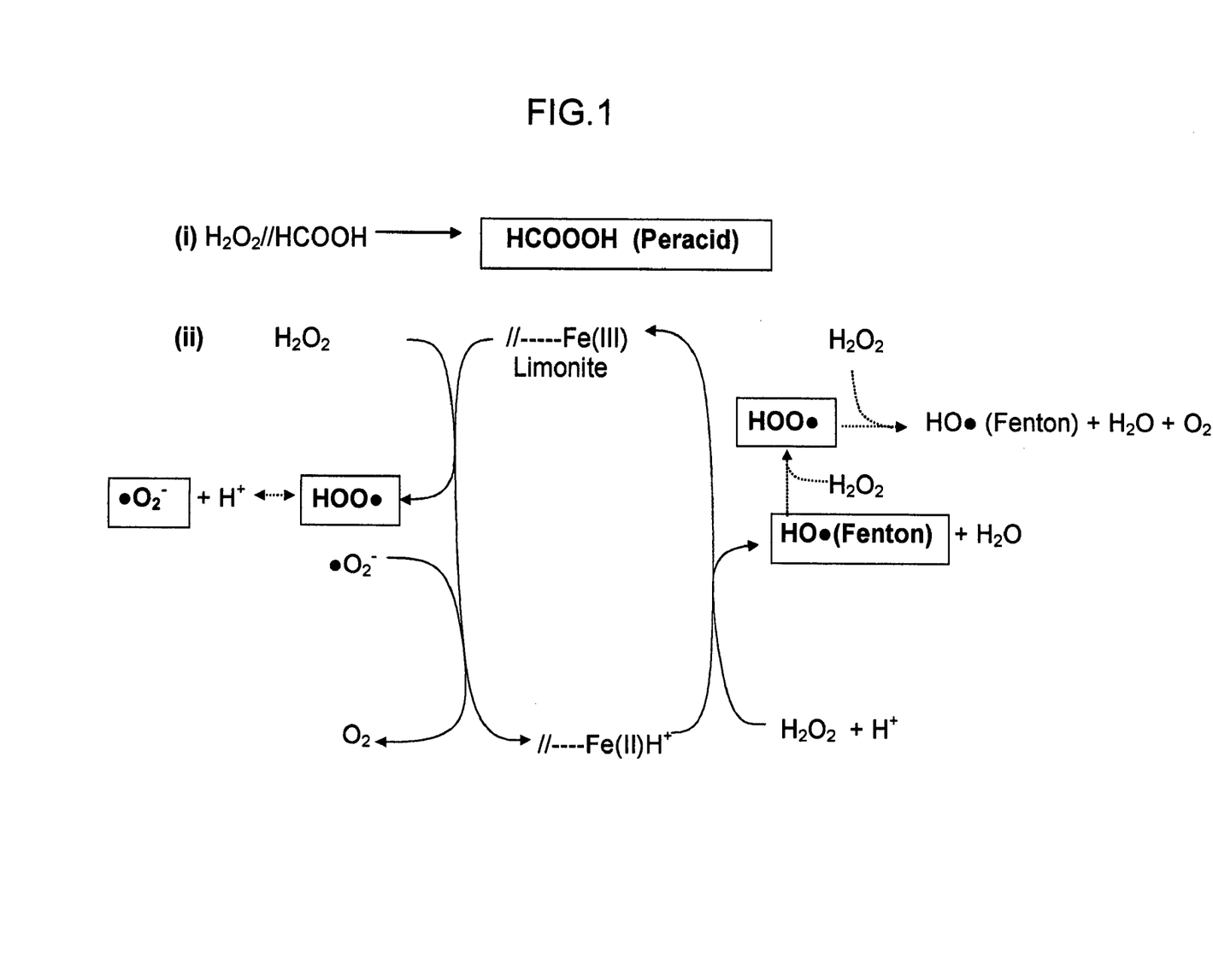
FIG. 1 attached is a scheme illustrating an estimation of the formation mechanisms of the oxidant species.

Through such treatment it is expected that some superficial Fe(III) of the goethite iron oxyhydroxide Fe(III) is reduced to Fe(II), which is a more active form for generating active oxidizing radicals in the presence of the $H_2O_2$/HCOOH couple as illustrated in FIG. 1.

The amount of reduced limonite catalyst employed in the process varies between 0.01 and 10 wt % based on the feed, or more preferably between 0.1 and 1 wt % based on the feed.

In view of the higher reaction activity a better oxidation is to be expected, as well as a larger diffusion of the oxidizing species.

Experimental results based on raw naphthas indicated that as compared to the system using raw limonite, hydrogenated limonite actually has brought improvements to the process. The reaction system, which is normally exothermal in both cases, has shown higher heat release upon the use of the hydrogenated catalyst.

Figure 2:
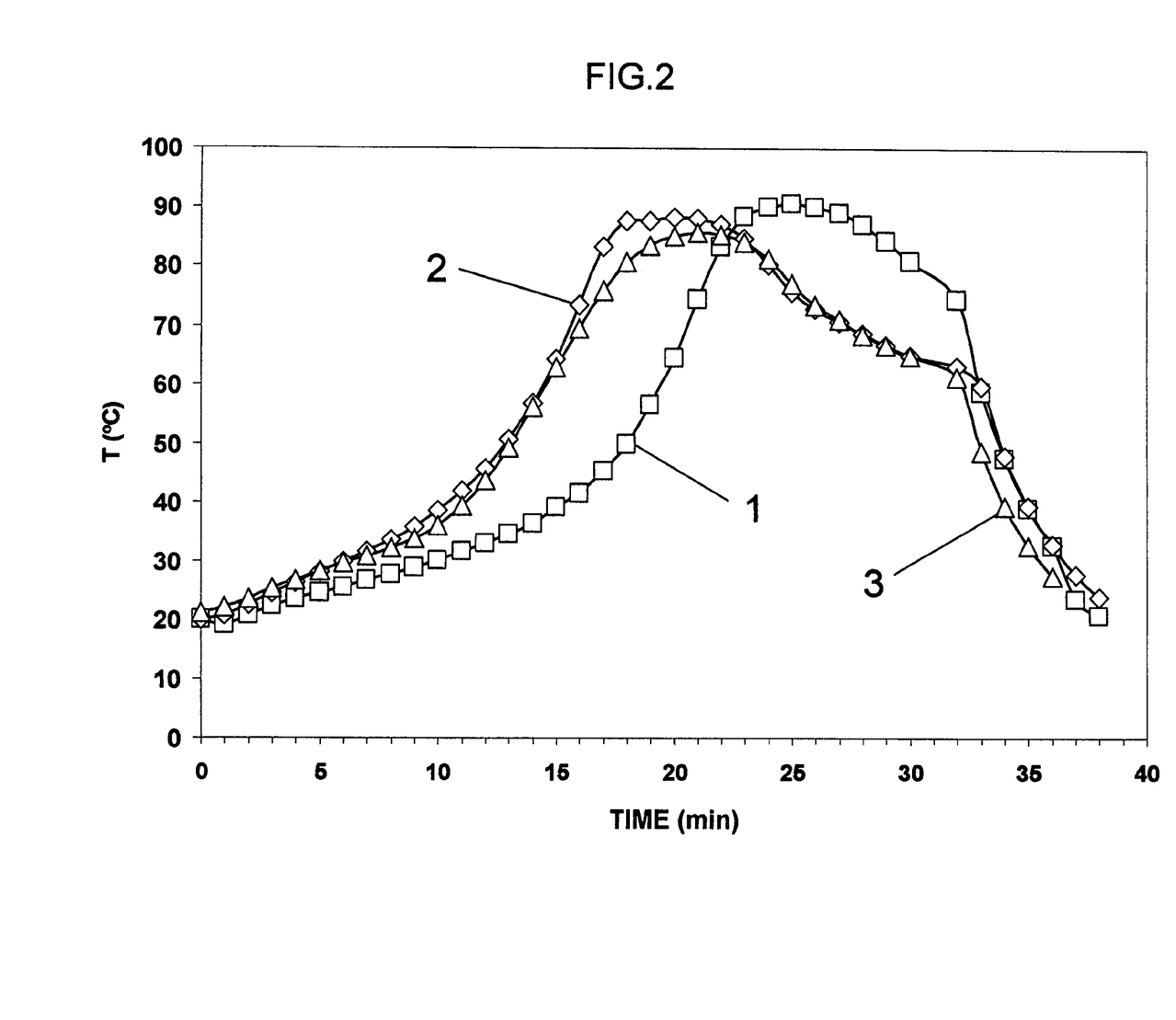
FIG. 2 attached is a graph illustrating the temperature profiles vs. time showing the higher exothermal reactivity of the reaction system according to the invention (curves 2 and 3) as compared to the state-of-the-art (curve 1) according to published US application US 2004/0108252.

The diagram of FIG. 2 for temperature profile tests of coke naphtha clearly shows that the hydrogenated catalyst of the invention, curves 2 and 3, promotes lower periods of exothermal reaction based on the state-of-the-art catalyst, curve 1, that is, the time spent between the onset of the reaction up to the exhaustion of the self-heating potential caused by the consumption of the system oxidizing substances. It should be emphasized that in both cases external cooling was added at 32 minutes reaction, a few minutes after the systems have exhausted their self-heating potentials.

It is believed that the increase in activity promoted by the hydrogenated catalyst allows the occurrence of a substantial amount of active oxidizing species quicker than in the non-hydrogenated case, such species being active for a shorter period than in the non-hydrogenated case. This makes that the extractive oxidation is more selective to the oxidized substances of stronger functional polarization, so as to promote less migration of non-contaminating polar hydrocarbons from the stream to the aqueous phase, as evidenced by the higher product yield by mass obtained with the hydrogenated catalyst as illustrated by the bar chart of FIG. 3. In this Figure, the dotted bar represents the obtained product and the hatched bar, the product losses in the contaminant extraction by the oxidizing solution.

Figure 4:
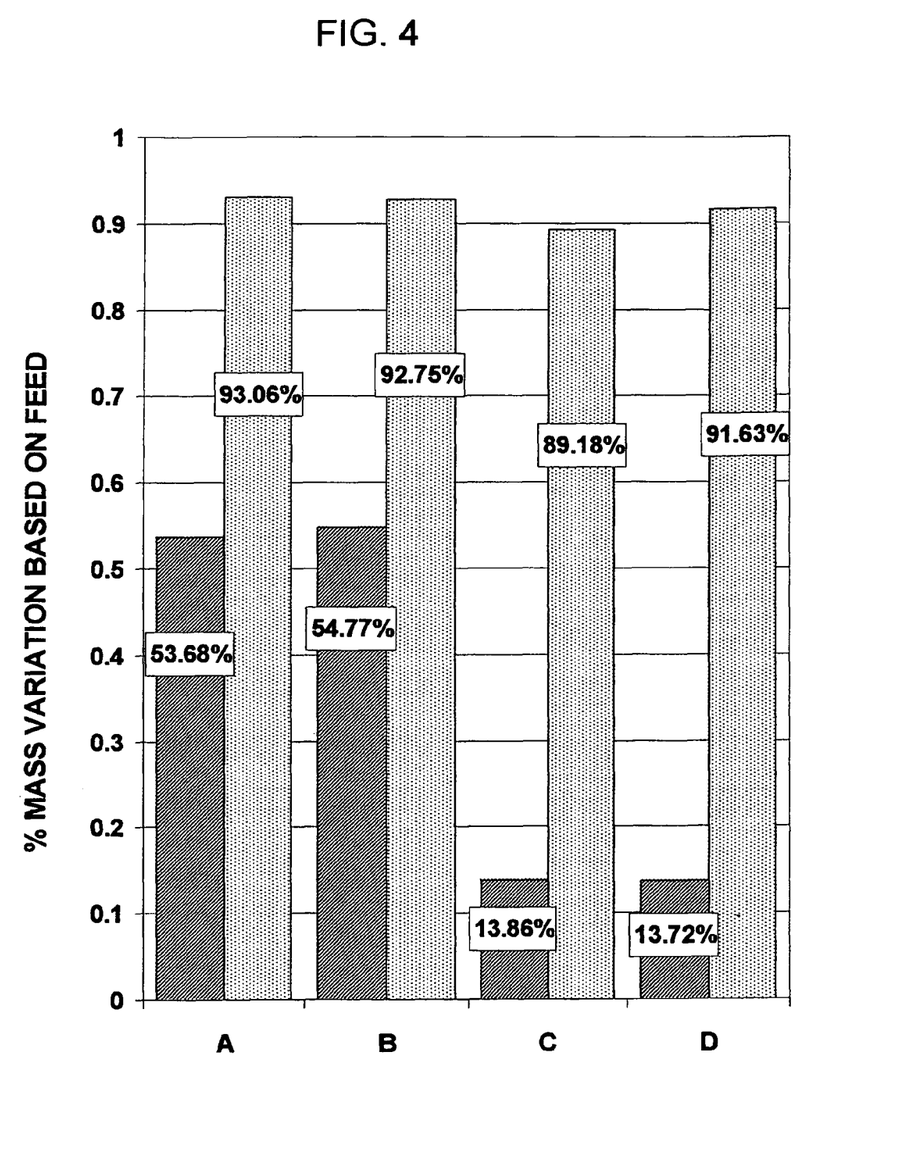
FIG. 4 attached is a bar chart illustrative of the sulfur and nitrogen compounds removal in terms of percentual mass variation based on the feed according to the invention. B is for coke naphtha and D is for shale naphtha as compared with the state-of-the-art, A, coke naphtha and C, shale naphtha according to published US application US 2004/0108252.

Simultaneously, the optimized system allows better product yields without penalizing the levels of the target contaminants, such fact being evidenced by the percent removal data of the sulfur and nitrogen contents related to the contents of the respective feeds, as indicated in the comparative bar chart of FIG. 4. In this Figure, the dotted bars represent the nitrogen compounds removal, while the hatched bars represent the sulfur removal.

The invention will now be illustrated by non-limiting Examples.

EXAMPLE 1

This Example illustrates the extractive oxidation procedure as taught in the state-of-the-art technique, published US application US 2004/0108252. A petroleum-related feed is used.

To a 1-L capacity, round-bottomed three-way flask provided with a reflux condenser filled with glass beads and cooled at −10° C. with ethyl alcohol, to which is attached a dry ice trap to scavenge any hydrocarbon non-condensed in the reflux or entrained by non-condensable gases is added the oxidizing solution made up of 40 ml $H_2O_2$ (50% w/w) and 32 ml formic acid (85% w/w), previously mixed during 10 minutes agitation.

To the same flask are added 500 mL naphtha from the delayed coking of Marlim crude residue of distillation range from 37° C. to 190° C., density @20/4 0.748, containing 3,480 ppm total sulfur and 360 ppm total Nitrogen. The mixture is vigorously agitated for 2 minutes and then is added 1 g catalyst made up of 100% limonite ore (45 wt % Fe, from nickel mines of Central Brazil) pulverized to less than 0.149 mm (−100 mesh Tyler) and oven-dried for 1 hour at 150° C. The reaction mixture is kept under vigorous agitation for 37 minutes. The reaction temperature starts at 20° C. and attains a maximum value of 91.2° C. after 23 minutes reaction by self-heating and drops naturally up to nearly 70° C. at 32 minutes, after what it is cooled to the ambient temperature. The reaction is complete after 37 mins and the naphtha and aqueous slurry phases are separated. The aqueous slurry is discarded off.

As a finishing treatment, the naphtha phase (pH 3-4) is neutralized with 200 ml of 10 wt % $Na_2CO_3$ solution under vigorous agitation for 35 minutes. The aqueous and organic phases are then separated, and 20 additional minutes are used for the complete decantation of residual visible solid material. The waste aqueous solution is discarded off and the neutralized naphtha (pH=6-7) is collected. The thus neutralized naphtha is washed with 100 mL of demineralized water and the phases are separated. The so washed naphtha is recovered by filtration on cotton and sent for analysis. The neutralization and washing procedures are carried out in a flask provided with a reflux such as is used in the reaction to prevent naphtha losses by evaporation.

The yield of upgraded naphtha obtained from this batch laboratory experiment is 94.67 % in weight-by-weight of feed including the amount of naphtha lost by evaporation during the bench scale laboratory procedures.

It should be considered that under a continuous operation regimen in a larger scale it is expected that such losses would be minimized. The amount of naphtha lost in the treatment is 5.33% wt/wt of the feed, of which 4.02% migrates to the oxidizing solution together with the oxidized contaminant substances, 0.65% wt/wt migrates to the neutralizing solution and 0.66% wt/wt migrates to the washing water.

The experimental analysis of the upgraded naphtha indicates 1,612 ppm total sulfur (53.68% removal) and 25.0 ppm total nitrogen (93.06% removal).

EXAMPLE 2

This Example illustrates the procedure according to the invention, using the reduced iron oxide catalyst. The feed is the same petroleum-related feed of Example 1.

To a 1-L capacity, round-bottomed three-way flask provided with a reflux condenser filled with glass beads and cooled at −10° C. with ethyl alcohol, to which is attached a dry ice trap to scavenge any hydrocarbon non-condensed in the reflux or entrained by non-condensable gases is added the oxidizing solution made up of 40 ml $H_2O_2$ (50% w/w) and 32 ml formic acid (85% w/w), previously mixed during 10 minutes agitation.

To the same flask are added 500 mL naphtha from the delayed coking of Marlim crude residue of distillation range from 37° C. to 190° C., density @20/4 0.748, containing 3,480 ppm total sulfur and 360 ppm total Nitrogen. The mixture is vigorously agitated for 2 minutes and then is added 1 g catalyst limonite ore hydrogenated according to the following procedure.

Ten grams of limonite ore (45 wt % Fe, from nickel mines from Central Brazil) of typical yellow ocher color are pulverized to less than 0.149 mm (−100 mesh Tyler) and dried in an oven for 1 hour at 150° C. and then placed in an autoclave provided with a device for continuous gas flow rate, where the limonite is submitted to a 1-hour contact with 10 L/h $H_2$ at 10 bar pressure and 300° C. temperature, after what there is obtained a dark, brilliant solid having magnetic properties.

After the addition of 1 g of the obtained solid, the reaction mixture is kept under vigorous agitation for 37 minutes. The reaction temperature the onset of which is 20° C. reaches a maximum value of nearly 88.1° C. after 18 minutes reaction by self-heating and drops naturally to 60° C. at 32 minutes reaction, and from this point on it is cooled up to the ambient temperature. The reaction is completed at 37 minutes and the naphtha and aqueous slurry are separated. The aqueous slurry is discarded off.

As a finishing treatment, the naphtha phase (pH 3-4) is neutralized with 200 ml of 10 wt % $Na_2CO_3$ solution under vigorous agitation for 35 minutes. The aqueous and organic phases are then separated, and 20 additional minutes are used for the complete decantation of residual visible solid material. The waste aqueous solution is discarded off and the neutralized naphtha (pH=6-7) is collected. The thus neutralized naphtha is washed with 100 mL of demineralized water and the phases are separated. The so washed naphtha is recovered by filtration on cotton and sent for analysis. The neutralization and washing procedures are carried out in a flask provided with a reflux such as is used in the reaction to prevent naphtha losses by evaporation.

The yield of upgraded naphtha so obtained from this batch laboratory experiment is 98.08% in weight-by-weight of feed including the amount of naphtha lost by evaporation during the bench scale laboratory procedures. It should be considered that under a continuous operation regimen in a larger scale it is expected that such losses would be minimized. The amount of naphtha lost in the treatment is 1.92% w/w of the feed, of which 1.81% migrates to the oxidizing solution together with the oxidized contaminant substances, 0.12% wt/wt migrates to the neutralizing solution and no amount is detected as having migrated to the washing water.

The experimental analysis of the upgraded naphtha indicates 1,574 ppm total sulfur (54.77% removal) and 26.1 ppm total nitrogen (92.75% removal).

EXAMPLE 3

This Example illustrates another procedure according to the state-of-the-art technique as applied to a feed from shale retorting.

To a 1-L capacity, round-bottomed three-way flask provided with a reflux condenser filled with glass beads and cooled at −10° C. with ethyl alcohol, to which is attached a dry ice trap to scavenge any hydrocarbon non-condensed in the reflux or entrained by non-condensable gases is added the oxidizing solution made up of 40 ml $H_2O_2$ (50% w/w) and 32 ml formic acid (85% w/w), previously mixed during 10 minutes agitation.

To the same flask are added 500 mL of naphtha from the retorting of oil shale containing 12,229.3 ppm total Sulfur and 2,570.2 ppm total Nitrogen.

The mixture is vigorously agitated for 2 minutes and then is added 1 g catalyst made up of 100% limonite ore (45 wt % Fe, from nickel mines of Central Brazil) pulverized to less than 0.149 mm (−100 mesh Tyler) and oven-dried for 1 hour at 150° C. The reaction mixture is kept under vigorous agitation for 37 minutes. The reaction temperature starts at 20° C. and attains a maximum value of 81.2° C. after 18 minutes reaction by self-heating and drops naturally up to nearly 62.6° C. at 30 minutes, after what it is cooled to the ambient temperature. The reaction is complete after 37 mins and the naphtha and aqueous slurry phases are separated. The aqueous slurry is discarded off.

As a finishing treatment, the naphtha phase (pH 3-4) is neutralized with 200 ml of 10 wt % $Na_2CO_3$ solution under vigorous agitation for 35 minutes. The aqueous and organic phases are then separated, and 20 additional minutes are used for the complete decantation of residual visible solid material. The waste aqueous solution is discarded off and the neutralized naphtha (pH =6-7) is collected. The thus neutralized naphtha is washed with 100 mL of demineralized water and the phases are separated. The so washed naphtha is recovered by filtration on cotton and sent for analysis. The neutralization and washing procedures are carried out in a flask provided with a reflux such as is used in the reaction to prevent naphtha losses by evaporation.

The yield of upgraded naphtha so obtained from this batch laboratory experiment is 93.96% in weight-by-weight of feed including the amount of naphtha lost by evaporation during the bench scale laboratory procedures. It should be considered that under a continuous operation regimen in a larger scale it is expected that such losses would be minimized. The amount of naphtha lost in the treatment is 6.04% w/w of the feed, of which 5.19% migrates to the oxidizing solution together with the oxidized contaminant substances, 0.66% wt/wt migrates to the neutralizing solution and 0.19% w/w migrates to the washing water.

The experimental analysis of the upgraded naphtha indicates 10,534.6 ppm total sulfur (13.86% removal) and 278.0 ppm total nitrogen (89.19% removal).

EXAMPLE 4

This Example illustrates a procedure according to the invention, as applied to the same oil shale-related feed of Example 3.

To a 1-L capacity, round-bottomed three-way flask provided with a reflux condenser filled with glass beads and cooled at −10° C. with ethyl alcohol, to which is attached a dry ice trap to scavenge any hydrocarbon non-condensed in the reflux or entrained by non-condensable gases is added the oxidizing solution made up of 40 ml $H_2O_2$ (50% w/w) and 32 ml formic acid (85% w/w), previously mixed during 10 minutes agitation.

To the same flask are added 500 mL of naphtha from the retorting of oil shale containing 12,229.3 ppm total Sulfur and 2,570.2 ppm total Nitrogen.

The mixture is vigorously agitated for 2 minutes and then is added 1 g catalyst limonite ore hydrogenated according to the following procedure.

Ten grams of limonite ore (45 wt % Fe, from nickel mines from Central Brazil) of typical yellow ocher color are pulverized to less than 0.149 mm (−100 mesh Tyler) and dried in an oven for 1 hour at 150° C. and then placed in an autoclave provided with a device for continuous gas flow rate, where the limonite is submitted to a 1-hour contact with 10 L h $H_2$ at 10 bar pressure and 300° C. temperature, after what there is obtained a dark, brilliant solid having magnetic properties.

After the addition of 1 g of the obtained solid, the reaction mixture is kept under vigorous agitation for 37 minutes. The reaction temperature the onset of which is 20° C. reaches a maximum value of nearly 88.3° C. after 17 minutes reaction by self-heating and drops naturally to 60.7° C. at 30 minutes reaction, and from this point on it is cooled up to the ambient temperature. The reaction is completed at 37 minutes and the naphtha and aqueous slurry are separated. The aqueous slurry is discarded off.

As a finishing treatment, the naphtha phase (pH 3-4) is neutralized with 200 ml of 10 wt % $Na_2CO_3$ solution under vigorous agitation for 35 minutes. The aqueous and organic phases are then separated, and 20 additional minutes are used for the complete decantation of residual visible solid material. The waste aqueous solution is discarded off and the neutralized naphtha (pH=6-7) is collected. The thus neutralized naphtha is washed with 100 mL of demineralized water and the phases are separated. The so washed naphtha is recovered by filtration on cotton and sent for analysis. The neutralization and washing procedures are carried out in a flask provided with a reflux such as is used in the reaction to prevent naphtha losses by evaporation.

The yield of upgraded naphtha so obtained from this batch laboratory experiment is 96.14% in weight-by-weight of feed including the amount of naphtha lost by evaporation during the bench scale laboratory procedures. It should be considered that under a continuous operation regimen in a larger scale it is expected that such losses would be minimized. The amount of naphtha lost in the treatment is 3.86% w/w of the feed, of which 3.38% migrates to the oxidizing solution together with the oxidized contaminant substances, 0.38% wt/wt migrates to the neutralizing solution and 0.10 % w/w migrates to the washing water.

The experimental analysis of the upgraded naphtha indicates 10,551.7 ppm total sulfur (13.72% removal) and 215.2 ppm total nitrogen (91.63% removal).

Figure 3:
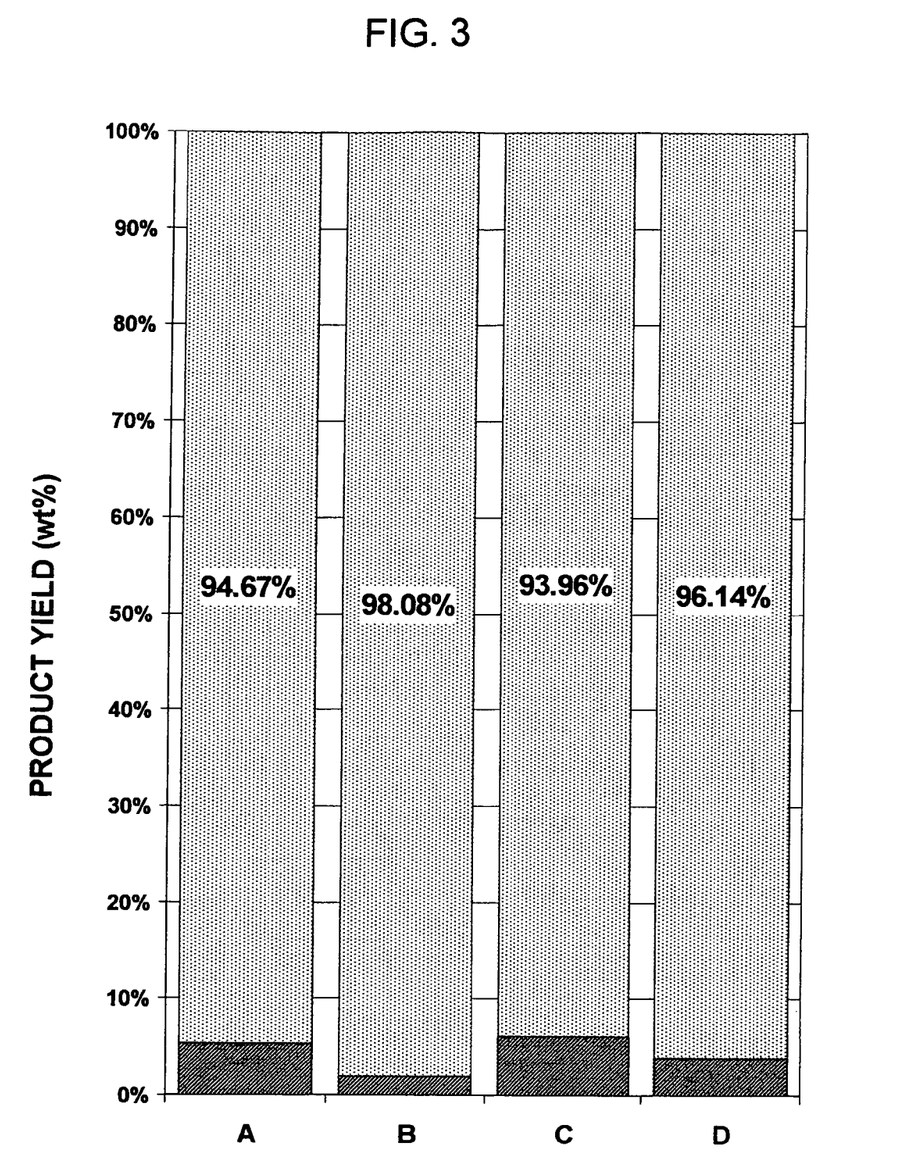
FIG. 3 attached is a bar chart illustrative of the treated product yield according to the invention, where B is coke naphtha, and D is shale naphtha as compared to the state-of-the-art, A, coke naphtha, and C shale naphtha according to published US application US 2004/0108252.

For a better understanding of the advantages in terms of product yield obtained by applying the inventive process using the reduced limonite as catalyst, FIGS. 2 and 3 show as bar graphs such yields, where the legend A and C relates to state-of-the-art examples while the B and D legends relate to the examples of the invention.

EXAMPLE 5

This Example, according to the invention, illustrates a slightly more severe catalyst treatment condition, which did not show an upgrading beyond those already observed for milder conditions.

To a 1-L capacity, round-bottomed three-way flask provided with a reflux condenser filled with glass beads and cooled at −10° C. with ethyl alcohol, to which is attached a dry ice trap to scavenge any hydrocarbon non-condensed in the reflux or entrained by non-condensable gases is added the oxidizing solution made up of 40 ml $H_2O_2$ (50% w/w) and 32 ml formic acid (85% w/w), previously mixed during 10 minutes agitation.

To the same flask are added 500 mL naphtha from the delayed coking of Marlim crude residue of distillation range from 37° C. to 190° C., density @20/4 0.748, containing 3,480 ppm total sulfur and 360 ppm total Nitrogen. The mixture is vigorously agitated for 2 minutes and then is added 1 g limonite ore catalyst hydrogenated according to the following procedure: Ten grams of limonite ore (45 wt % Fe, from nickel mines from Central Brazil) of typical yellow ocher color are pulverized to less than 0.149 mm (−100 mesh Tyler) and dried in an oven for 1 hour at 150° C. and then placed in an autoclave provided with a device for continuous gas flow rate, where the limonite is submitted to a 1.5-hour contact with 10 L/h $H_2$ at 20 bar pressure and 350° C. temperature, after what there is obtained a dark, brilliant solid having magnetic properties. After the addition of 1 g of the obtained solid, the reaction mixture is kept under vigorous agitation for 37 minutes. The reaction temperature the onset of which is at 20° C. attains a maximum value of 85.6° C. after 20 minutes reaction by self-heating and drops naturally up to nearly 60° C. at 32 minutes, after what it is cooled to the ambient temperature. The reaction is complete after 37 mins and the naphtha and aqueous slurry phases are separated. The aqueous slurry is discarded off.

As a finishing treatment, the naphtha phase (pH 3-4) is neutralized with 200 ml of 10 wt % $Na_2CO_3$ solution under vigorous agitation for 35 minutes. The aqueous and organic phases are then separated, and 20 additional minutes are used for the complete decantation of residual visible solid material. The waste aqueous solution is discarded off and the neutralized naphtha (pH=6-7) is collected. The thus neutralized naphtha is washed with 100 mL of demineralized water and the phases are separated. The so washed naphtha is recovered by filtration on cotton and sent for analysis. The neutralization and washing procedures are carried out in a flask provided with reflux such as is used in the reaction to prevent naphtha losses by evaporation.

The yield of upgraded naphtha so obtained from this batch laboratory experiment is 97.7% in weight-by-weight of feed including the amount of naphtha lost by evaporation during the bench scale laboratory procedures. It should be considered that under a continuous operation regimen in a larger scale it is expected that such losses would be minimized. The amount of naphtha lost in the treatment is 2.80% w/w of the feed, of which 2.52% migrates to the oxidizing solution together with the oxidized contaminant substances, 0.23% wt/wt migrates to the neutralizing solution and 0.04% wt/wt migrates to the washing water.

The experimental analysis of the upgraded naphtha indicates 1,735.34 ppm total Sulfur (50.13% removal) and 24.05 ppm total nitrogen (91.41% removal).

We claim:

1. A process for the extractive oxidation of contaminants present in raw fuel streams catalyzed by iron oxides, where heteroatomic polar and unsaturated compounds of said streams are oxidized and simultaneously extracted into the aqueous phase by an aqueous slurry of a peroxide in solution/organic acid couple and catalyst based on iron oxides contained in natural limonitic goethite, under acidic conditions, atmospheric pressure and ambient or higher temperature, while a fuel stream is separated from the catalyst, wherein said process comprises contacting a raw naphtha stream under oxidation conditions in the presence of said oxidizing aqueous slurry and reduced limonitic goethite, between 0.01 and 10 wt % based on the raw naphtha stream, in a Fenton-like system, whereby there is obtained a naphtha fuel at higher than 98 wt % yield based on the raw naphtha stream with a low loss by migration to the aqueous phase and with removal of sulfur and nitrogen compounds.

2. A process according to claim 1, wherein the reduced limonitic goethite is prepared by submitting the natural limonitic goethite to conditions of a confined atmosphere containing oxygen-free hydrogen of purity of at least 80 wt/wt %, at a pressure equal or higher than the atmospheric, and temperatures from the ambient up to 500° C., for periods of time of up to two hours.

3. A process according to claim 2, wherein the confined atmosphere contains hydrogen at a purity between 90 to 100 wt/wt %, the hydrogen pressure is from the atmospheric up to 20 bar, the temperature from the ambient up to 350° C., and the treatment period, from 5 minutes to 1.5 hours.

4. A process according to claim 3, where the hydrogen pressure is from the atmospheric up to 10 bar, the temperature from 200° C. to 350° C. and the treatment period, from 30 minutes to 1.5 hours.

5. A process according to claim 1, wherein the amount of reduced limonite catalyst used is between 0.1 and 1 wt %, based on the feed.

* * * * *